United States Patent
Ji et al.

(10) Patent No.: US 9,204,464 B2
(45) Date of Patent: *Dec. 1, 2015

(54) CONTROL OF QUALITY OF SERVICE IN OVERLAPPING BASIC SERVICE SETS IN WIRELESS LOCAL AREA NETWORKS

(71) Applicant: AT&T Intellectual Property I, L.P., Atlanta, GA (US)

(72) Inventors: Lusheng Ji, Randolph, NJ (US); Robert Raymond Miller, II, Convent Station, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 498 days.

This patent is subject to a terminal disclaimer.

(21) Appl. No.: 13/633,208

(22) Filed: Oct. 2, 2012

(65) Prior Publication Data

US 2013/0064236 A1   Mar. 14, 2013

Related U.S. Application Data

(63) Continuation of application No. 12/276,836, filed on Nov. 24, 2008, now Pat. No. 8,305,885.

(60) Provisional application No. 61/126,878, filed on May 8, 2008.

(51) Int. Cl.
*H04L 12/413* (2006.01)
*H04W 74/08* (2009.01)
*H04W 16/14* (2009.01)

(52) U.S. Cl.
CPC .......... *H04W 74/0816* (2013.01); *H04W 16/14* (2013.01); *H04W 74/0875* (2013.01)

(58) Field of Classification Search
USPC ............ 370/229, 230, 235, 252, 346, 395.42, 370/431, 445, 447, 449, 455, 461
See application file for complete search history.

(56) References Cited

U.S. PATENT DOCUMENTS 7,095,754 B2   8/2006   Benveniste
8,305,885 B2 *  11/2012   Ji et al. ........................ 370/229

OTHER PUBLICATIONS

Jiang, Hai, et al., "A Distributed Channel Access Scheme with Guaranteed Priority and Enhanced Fairness", IEEE Transactions on Wireless Communications, vol. 6, No. 6, Jun. 2007, pp. 2114-2125.

(Continued)

*Primary Examiner* — Yemane Mesfin
*Assistant Examiner* — Mon Cheri Davenport
(74) *Attorney, Agent, or Firm* — Guntin & Gust, PLC; Douglas Schnabel

(57) ABSTRACT

Access priority for wireless devices located in an area in which radiofrequency (RF) coverage areas of a first wireless access point and a second wireless access point overlap is controlled by coordinating operation of the first wireless access point and the second wireless access point. The wireless devices access a common RF channel via a collision sense multiple access/collision avoidance mechanism. The probability of accessing the RF channel may be varied by adjusting the length of interframe spacings and the length of contention windows. The length of the interframe spacings and the length of the contention windows associated with the first access point and associated with the second access point are configured such that the probability of wireless devices associated with the first wireless access point accessing the RF channel is greater than the probability of wireless devices associated with the second wireless access point accessing the RF channel.

20 Claims, 10 Drawing Sheets

(56) References Cited

OTHER PUBLICATIONS

Siris, Vasilios A. et al., "Resource Control for the Enhanced Distributed Channel Access (EDCA) Mechanism in IEEE 802.11e", Technical Report 352—Mar. 2005, Institute of Computer Science (ICS), Foundation for Research and Technology—Hellas (FORTH), Crete, Greece, pp. 1-16.

Huang, Ching-Ling, et al., "Throughput and Delay Performance of IEEE 802.11e Enhanced Distributed Channel Access (EDCA) Under Satuation Condition", IEEE Transactions on Wireless Communications, vol. 6, No. 1, Jan. 2007, pp. 136-145.

Beriemann, Lars, et al., "Delay Performance of the Enhanced Distributed Channel Access of IEEE 802.11e", Proc. of 1st Mobile and Wireless Communication Summit 2006, Myconos, Greece, Jun. 4-8, 2006.

Beriemann, Lars, et al., "Enhanced Distributed Channel Access of IEEE 802.11e as Policy for Cognitive Radios", WWRF 15, 15th Meeting of the Wireless World Research Forum, Paris, France, Dec. 8-9, 2005.

Inanc, Inan AL., "Saturation Throughput Analysis of the 802.11e Enhanced Distributed Channel Access Function", IEEE International Conference on Communications, Jun. 24-28, 2007, pp. 409-414.

Saurabh, Sehrawat, et al., "Performance Analysis of QoS Supported by Enhanced Distributed Channel Access (EDCA) Mechanism in IEEE 802.11e", IAENG International Journal of Computer Science, vol. 33, Issue 1, 2007.

U.S. Appl. No. 11/999,302, filed Dec. 5, 2007, Inventors: Lusheng Ji, et al.

* cited by examiner

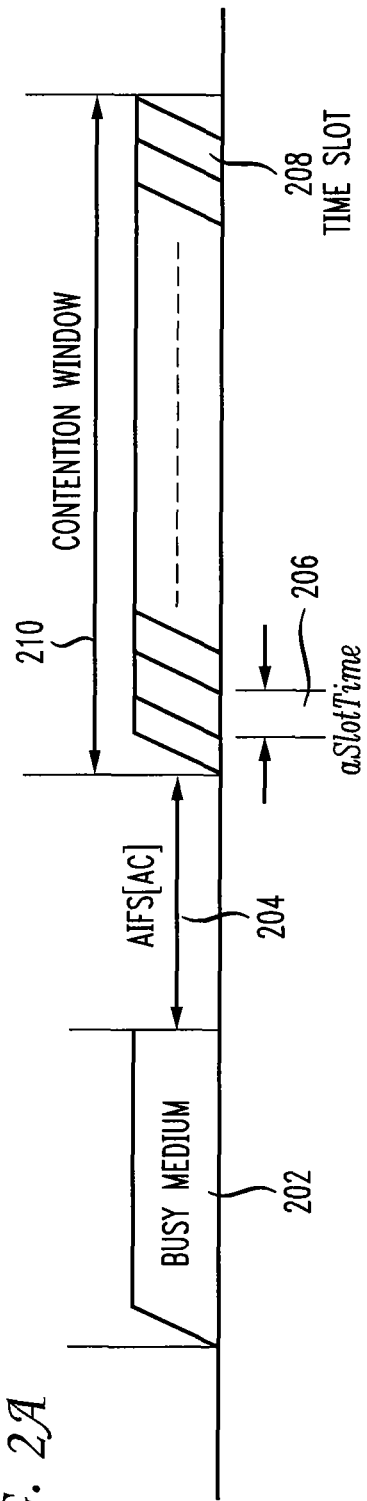
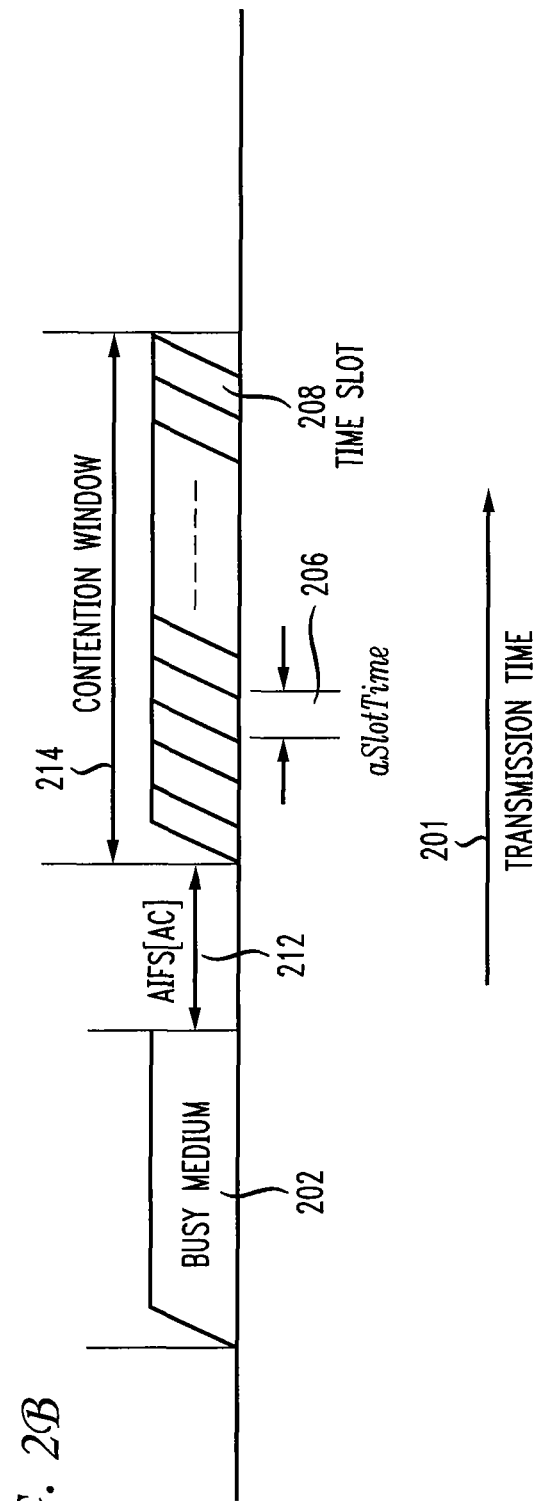

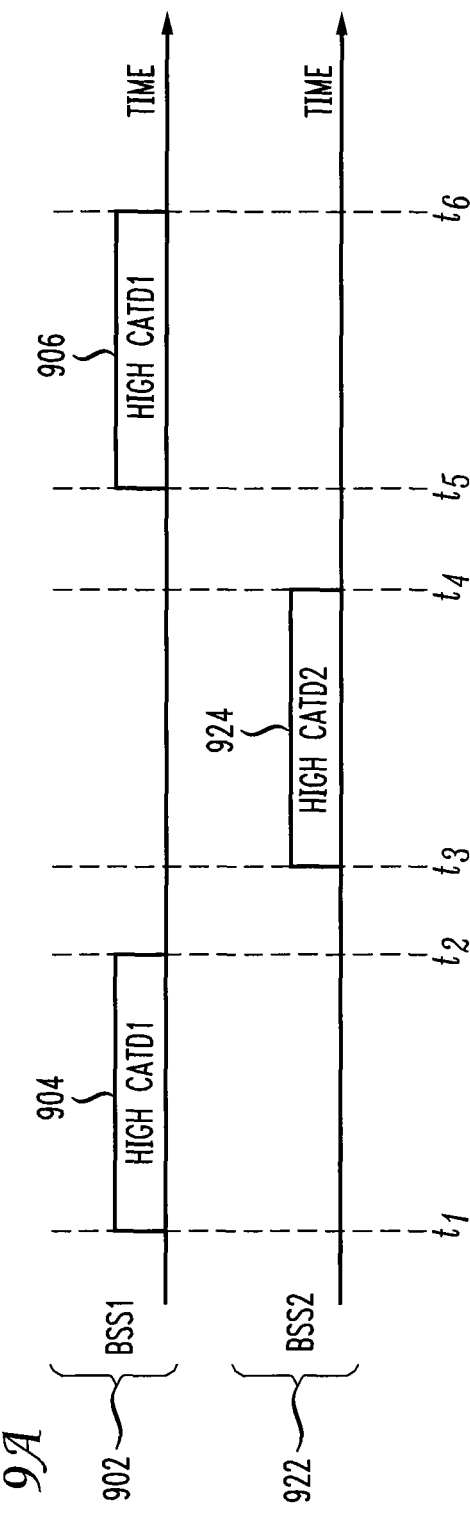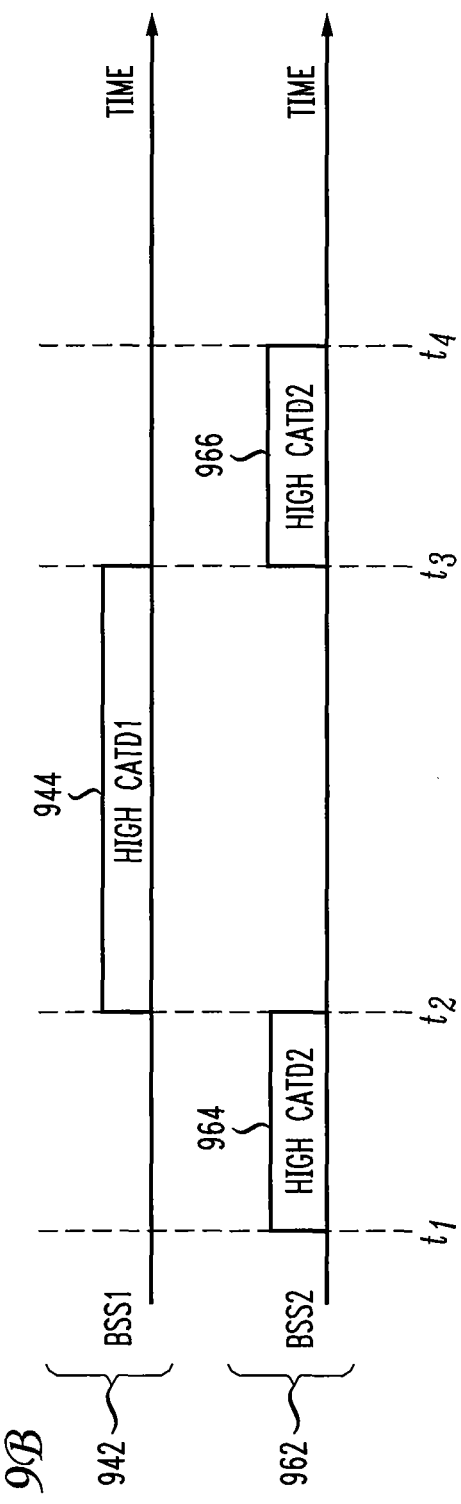

CONTROL OF QUALITY OF SERVICE IN OVERLAPPING BASIC SERVICE SETS IN WIRELESS LOCAL AREA NETWORKS

This application is a continuation of prior application Ser. No. 12/276,836, filed on Nov. 24, 2008, which claims the benefit of Provisional Application No. 61/126,878, filed on May 8, 2008; both application Ser. No. 12/276,836 and Provisional Application No. 61/126, 878 are herein incorporated by reference in their entirety.

BACKGROUND OF THE INVENTION

The present invention relates generally to wireless local area networks, and more particularly to control of quality of service in overlapping wireless local area network basic service sets.

Wireless local area networks (WLANs) provide advantages both for network provisioning and for customer services. For a network provider, a WLAN reduces required runs of infrastructure cabling. For a network user, a WLAN provides ready access for mobile devices such as laptop computers, personal digital assistants, and cell phones equipped with data capabilities. WLANs may be configured via various network schemes. Some are proprietary, and some follow industry standards. At present, many widely-deployed WLANs follow the IEEE 802.11 standards.

WLANs may be further classified by architecture. In a mobile ad-hoc network, wireless devices, such as laptops outfitted with wireless modems, communicate directly with each other in a peer-to-peer mode over a radiofrequency (RF) channel. In an infrastructure network, wireless devices communicate with an access point via a RF channel. A home WLAN typically will be served by a single access point, such as a wireless router. The wireless router then connects to a packet data network via a broadband access service, such as digital subscriber line, cable, or fiberoptics. Wireless devices may also communicate with each other via the single access point.

To provide RF coverage over a wider area, such as in an airport or commercial complex, multiple access points are often deployed. The RF coverage areas of multiple access points may overlap. In some instances, the overlap is intentional to provide seamless coverage. In other instances, the overlap is unintentional since the boundaries of RF coverage areas are not sharply defined. RF coverage areas may also overlap if more than one network is operating in the same location. For example, in a commercial environment, competing network providers may be offering services in the same, or an adjacent, location. In a residential environment, such as an apartment complex or a neighborhood in which houses are close together, WLANs independently operated by neighbors may overlap in RF coverage area.

In a widely-deployed WLAN protocol, devices communicate with each other over a common channel on a contention basis. That is, each device attempts to independently acquire the channel. At a given instance, if there are multiple contending devices, the device which actually acquires the channel is governed by a carrier sense multiple access/collision avoidance (CSMA/CA) protocol and a random backoff mechanism. When a device wants to transmit, it first senses the medium (RF channel) to determine whether the medium is busy. The medium is busy if there is already data traffic on the RF channel. If the medium is determined to be busy, the device defers until the end of the current transmission. After the device senses an idle channel, or prior to attempting to transmit again immediately after a successful transmission, the device defers transmission for an additional delay period. If the channel remains idle throughout the delay period, the device then selects a random backoff interval. The random backoff interval comprises a number of time slots, and a timer counts down the number of time slots. If the channel remains idle throughout the random backoff interval, the device acquires the channel at the end of the random backoff interval and starts to transmit.

For packet data transmission, the CSMA/CA mechanism provides efficient channel utilization when the channel is shared by multiple devices, and the traffic load is moderate. WLANs, however, are increasingly being used to transport multimedia services (voice, video, and data). Voice and video transport have more stringent network transport requirements (quality of service) than data. Quality of service (QoS) parameters include packet loss, delay time, and jitter. The basic CSMA/CA mechanism does not distinguish priorities among the different classes of multimedia services. Since they all contend for the channel on an equal basis, video and voice quality may be degraded when the channel is heavily loaded.

Enhancements to the basic CSMA/CA provide various degrees of QoS support. In the scheduled access mode, devices are individually polled by a channel access coordinator. For example, in a WLAN controlled by a single access point, the access point may serve as a channel access coordinator to coordinate the devices in the network. Under scheduled access, devices do not need to execute the carrier sensing and backoff mechanisms. At a given instance, only the one device being polled is allowed to transmit. Due to the deterministic nature of scheduled access, QoS, in some instances, may be guaranteed by the polling schedule. Scheduled access, however, is complex to manage in deployments and has not been widely deployed.

An alternative mechanism for QoS support is referred to as the enhanced distributed channel access (EDCA) mechanism. EDCA recognizes four different traffic service classes (background, best effort, video, and voice). Priority is provided via a set of configurable parameters (EDCA parameter set) which are transmitted by an access point to the mobile devices under its control. EDCA, however, may not be efficient or effective if two or more access points have overlapping RF coverage areas. For example, if there are two access points, a first set of mobile devices is controlled by the first access point, and a second set of mobile devices is controlled by the second access point. The first access point controls (to a degree) QoS among the traffic streams transmitted by the set of mobiles under its control. Similarly, the second access point controls (to a degree) QoS among the traffic streams transmitted by the set of mobiles under its control.

If the two access points operate independently, however, traffic streams from mobiles in the first set and traffic streams from mobiles in the second set may compete equally for channel access if the mobiles are located in the region of overlapping RF coverage. For example, a high-priority video stream transmitted by a mobile controlled by the first access point may compete equally for the channel with a high-priority video stream transmitted by a mobile controlled by the second access point. In some instances, a high-priority traffic stream transmitted by a mobile controlled by the first access point may compete equally for the channel with a lower priority traffic stream transmitted by a mobile controlled by the second access point.

Since there may be more devices competing for channel access in the overlapping RF coverage area (when compared to the number of devices within an equivalent area covered by only one access point), channel access deferral due to backoff and collisions are more likely to occur; hence the overall channel access efficiency may be reduced. Traffic streams from mobiles in the first set and traffic streams from mobiles in the second set may also compete unfairly for channel access if the mobiles are located in the overlapping RF coverage area. If the channel access parameters of the first set are configured differently from those of the second set such that traffic streams in the first set have a higher probability of winning the channel access than traffic streams of the same priority class in the second set, traffic streams in the first set have an unfair advantage. In some instances, the channel access parameters may even be configured such that a low priority traffic stream in the first set may have higher channel access probability than a high priority traffic stream in the second set. What are needed are method and apparatus for controlling QoS for wireless devices in regions of overlapping RF coverage.

BRIEF SUMMARY OF THE INVENTION

In an embodiment of the invention, access priority for wireless devices located in an area in which the radiofrequency (RF) coverage area of a first wireless access point and the RF coverage area of a second wireless access point overlap is controlled by coordinating the operation of the first wireless access point and the second wireless access point. The wireless devices access a common RF channel via a collision sense multiple access/collision avoidance (CSMA/CA) mechanism. The probability of accessing the RF channel may be varied by adjusting the length of interframe spacings and the length of contention windows. During a time interval, the length of the interframe spacings and the length of the contention windows associated with the first access point and the length of the interframe spacings and the length of contention windows associated with the second access point are configured such that the probability of wireless devices associated with the first wireless access point accessing the RF channel is significantly greater than the probability of wireless devices associated with the second wireless access point accessing the RF channel.

These and other advantages of the invention will be apparent to those of ordinary skill in the art by reference to the following detailed description and the accompanying drawings.

BRIEF DESCRIPTION OF THE DRAWINGS

FIG. 2A and FIG. 2B show a high-level schematic of a sequence for channel acquisition;

FIG. 9A and FIG. 9B show high-level schematics of a transmission sequence in which priority is alternated between two basic service sets.

DETAILED DESCRIPTION

Figure 1:
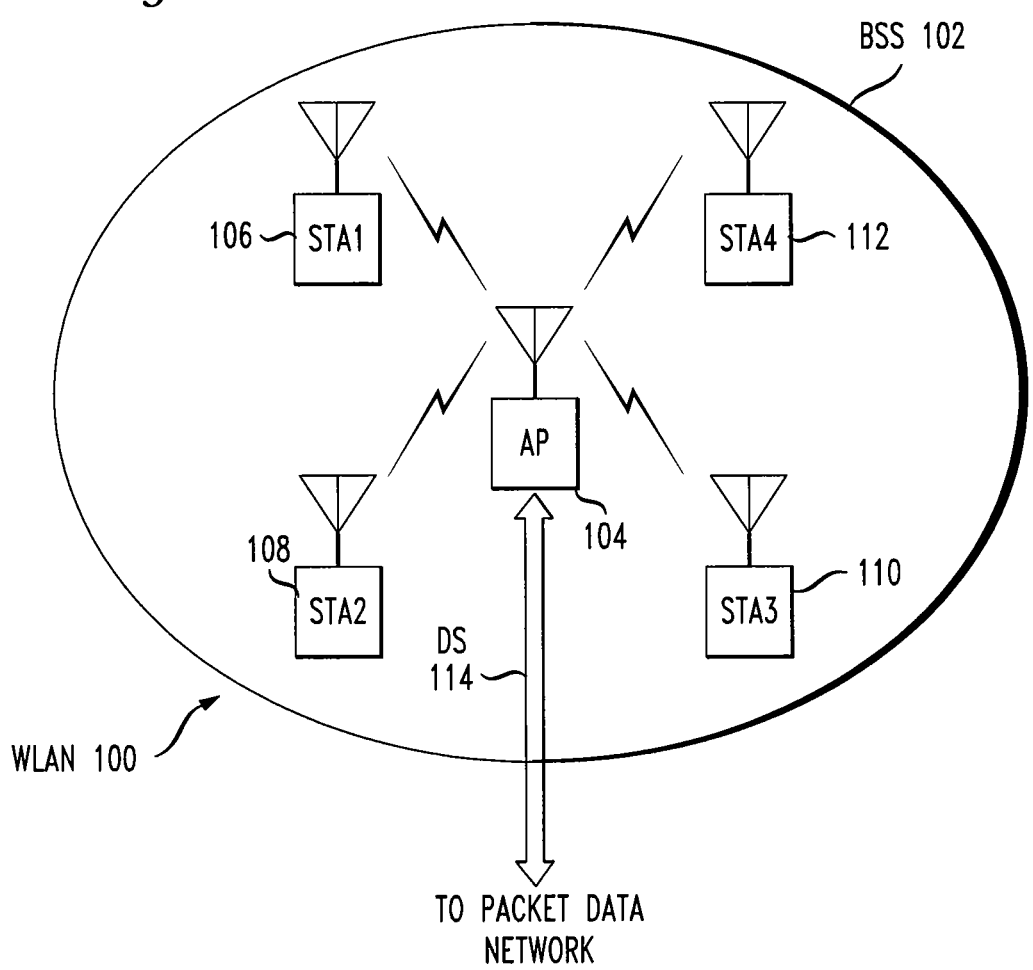
FIG. 1 shows a high-level schematic of a wireless local area network with a single access point.

FIG. 1 shows the basic network architecture of a wireless local area network WLAN 100 with a single access point AP 104. In the examples below, WLANs refer to WLANs conforming to IEEE 802.11 standards. One skilled in the art, however, may adapt embodiments of the invention to other WLANs. The nomenclature of the IEEE 802.11 standards is used herein. In a WLAN, any addressable wireless device may be called a station (STA). Stations may be fixed, portable, or mobile. A portable STA is a wireless device that is capable of being moved from place to place, such as a laptop which may be moved from one desk to another. During operation, however, a portable device is stationary. A mobile STA is a user device, such as a laptop or personal digital assistant, that is in actual motion during operation. In FIG. 1, four stations, STA1 106-STA4 112, are shown. The stations STA1 106-STA4 112 communicate over radiofrequency (RF) channels with access point AP 104, which connects via distribution system DS 114 to a packet data network, details of which are not shown. An example of a distribution system is a wired Ethernet local area network (LAN). A distribution system, however, may also be a wireless network.

An AP may be considered as a special class of STA. STAs associated with the access point connect to the distribution system via the access point. The access point also provides WLAN management services. The area over which an access point provides service is referred to as the basic service area (BSA). The BSA is approximately defined by the RF coverage of the access point, and is nominally fixed. Changes in the RF environment, such as arising from building reconstruction or movement of large equipment, however, may alter the BSA topology.

Stations within the BSA form a network connection to a WLAN by becoming associated with the access point. The set of stations associated with an access point is referred to as the basic service set (BSS) of the access point. These stations are also referred to as members of the associated BSS. In WLAN 100, the basic service set BSS 102 of the access point AP 104 is the set of stations STA1 106-STA4 112 associated with access point AP 104. In FIG. 1, the oval representing BSS 102 pictorially indicates the region of the BSA. The IEEE 802.11 standards, however, labels the region with the associated BSS. This convention is followed herein. Association provides several functions. An important one is mapping a network address of an STA to a network address reachable by the packet data network via the DS. At any given instance, an STA is associated with one and only one AP. Since stations may move in and out of the BSA, the BSS of an access point in general is dynamic. If the set of associated stations does not change, then the BSS is static.

In a WLAN BSS, STAs communicate with the AP over a common RF channel. Although the IEEE 802.11 standards support a polling mechanism for medium access control (MAC), it is not widely deployed. Medium access control is typically provided by a carrier sense multiple access with collision avoidance (CSMA/CA) protocol and a random backoff mechanism. When a STA wants to transmit, it first senses the medium (RF channel) to determine whether the medium is busy. The medium is busy if there is already data traffic on the RF channel. If the medium is determined to be busy, the device defers until the end of the current transmission. After the device senses an idle channel, or prior to attempting to transmit again immediately after a successful transmission, the device defers transmission for an additional delay period, referred to as an interframe space. As discussed in further detail below, there are various interframe spaces. If the channel remains idle throughout the interframe space, the device selects a random backoff interval, referred to as the contention window (CW). The random backoff interval comprises a number of time slots, and a timer counts down the number of time slots. If the channel remains idle throughout the CW, the device acquires the channel at the end of the CW and starts to transmit. For each STA, the length of the backoff interval is randomly selected to reduce the probability that multiple STAs will transmit simultaneously once they sense an idle channel.

The basic CSMA/CA protocol does not differentiate among traffic service classes (voice, video, and data). All traffic streams contend on an equal basis for channel access. The IEEE 802.11 standards provide an enhancement to the basic CSMA/CA protocol to provide a degree of QoS control. This mechanism, designated as enhanced distributed channel access (EDCA), supports four traffic service classes (QoS classes), referred to as access categories (ACs). In increasing order of priority, the four ACs are Background, Best Effort, Video, and Voice.

Priority is controlled by an EDCA parameter set, which is transmitted from an AP to its associated member STAs via a special set of frames (discussed below). Each associated STA sets the values of its EDCA parameters according to the values in the EDCA parameter set received from the AP. An STA also has a pre-programmed default set of values of EDCA parameters, which is used if it does not receive an EDCA parameter set from the AP. Priority control may be achieved by varying the following parameters for different UP values:

Amount of time a STA senses the channel to be idle before backoff or transmission;

Length of the contention window to be used for the backoff; and

Duration a STA may transmit after it acquires the channel.

These parameters are discussed in more detail below. Note that EDCA does not guarantee QoS for a specific traffic stream. It provides only a statistically higher probability of transmission for higher priority service classes. Traffic streams within the same service class have the same probability and still rely on contention resolution for channel access.

FIG. 2A and FIG. 2B are schematics showing channel acquisition sequences for an STA following the EDCA protocol. The traffic stream represented in FIG. 2B has higher priority than the traffic stream represented in FIG. 2A. The transmission time 201 increases from left to right. Time intervals are measured in increments of time slots. Time slot 208 is a representative time slot. The length of a time slot is aSlotTime 206. As discussed above, when an STA has data to transmit, it first senses the medium to determine whether it is busy. In the examples shown in FIG. 2A and FIG. 2B, the medium is busy over the time interval 202. Once the medium is idle, the STA does not transmit immediately, but defers access for a time interval referred to as an interframe space (IFS). The ECDA protocol designates a range of IFSs to support priority levels for channel access. The short interframe space (SIFS) is the minimum IFS. The point coordination function interframe space (PIFS) is used for a polling mechanism. As discussed above, polling is not widely deployed and is not discussed further herein. Distributed coordination function interframe space (DIFS) is used by non-QoS enabled STAs. Arbitration interframe spaces (AISs) are used by QoS enabled STAs. The length of an AIFS is dependent on the access category:

$$AIFS[AC]=AIFSN[AC] \times aSlotTime+aSIFSTime, \quad (E1)$$

where AIFS[AC] is the AIFS value for access category AC, AIFSN[AC] is the number of time slots for access category AC, aSlotTime is the length of a time slot, and aSIFSTime is the length of a short interframe space. Higher priority may be assigned by specifying lower values of AIFSN[AC]. A smaller value of AIFS[AC] increases the probability of acquiring the channel because the STA waits for a shorter interval before starting the backoff timer (see below). The traffic stream in FIG. 2B has a higher priority than the traffic stream in FIG. 2A. Therefore, the arbitration interframe space AIFS[AC] 212 for the traffic stream in FIG. 2B is shorter than the arbitration interframe space AIFS[AC] 204 in FIG. 2A.

As discussed above, if the channel remains idle throughout the corresponding IFS, the STA defers transmission for an additional time interval, referred to as the contention window (CW), specified by a random backoff interval. This random backoff interval reduces the probability of collision if multiple STAs simultaneously attempt to transmit once the channel becomes idle. A contention window comprises a number of time slots. For a specific transmission, the length of the CW is randomly selected between 0 and an upper bound. The upper bound is variable, ranging from a minimum upper bound CWmin to a maximum upper bound CWmax. The upper bound is initially set to CWmin, and a backoff interval is randomly chosen from the range 0 to CWmin. If the first transmission attempt fails, the upper bound is doubled to 2 CWmin. If the second transmission attempt fails, the upper bound is again doubled to 4 CWmin. This doubling of the upper bound continues until either the transmission attempt succeeds or the maximum value of the upper bound, CWmax, is reached. Values of CWmin and CWmax may be assigned at the frame level. Since the probability of acquiring the channel increases as the CW decreases, the priority of frames belonging to different traffic service classes may be configured by assigning different values of CWmin and CWmax to different access categories. If the medium stays idle until the end of the CW, the STA may then acquire the channel and start to transmit. Once an STA acquires a channel, it may exchange multiple frames. The maximum number of frame exchange sequences is controlled by the parameter TXOP Limit (also referred to herein as maximum transmission limit). For a specific traffic stream, QoS is a function of the probability of acquiring the channel and of the length of time it may transmit once it has acquired the channel. Herein, an EDCA parameter set comprises a set of arbitration interframe spacings, a set of minimum upper bounds for contention windows, a set of maximum upper bounds for contention windows, and a set of maximum transmission limits. Herein, each arbitration interframe spacing, each minimum upper bound for contention windows, each maximum upper bound for contention windows, and each maximum transmission limit correspond to an access category.

Figure 3:
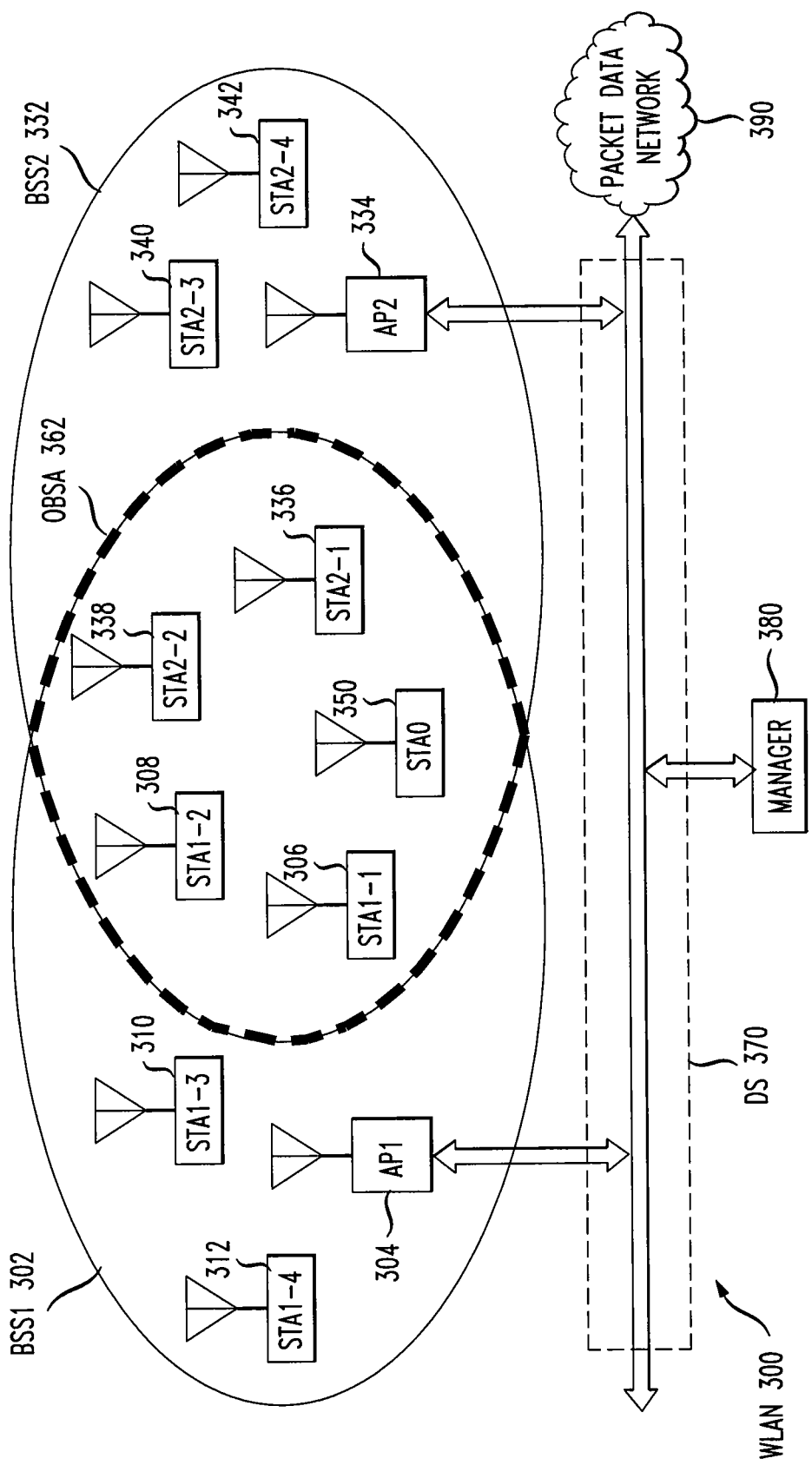
FIG. 3 shows a high-level schematic of a wireless local area network with two access points.

Controlling QoS is problematic in larger WLANs that include more than one AP. FIG. 3 shows the basic network architecture of WLAN 300, which includes two access points, AP1 304 and AP2 334, and their associated basic service sets, BSS1 302 and BSS2 332, respectively. Stations STA1-1 306-STA1-4 312 are associated with AP1 304. Stations STA2-1 336-STA2-4 342 are associated with AP2 334. STA0 350 is a monitor station, which is discussed below. The RF coverage areas of AP1 304 and AP2 334 are not sharply defined. In the example shown in FIG. 3, BSS1 302 and BSS2 332 intentionally overlap to provide seamless coverage for stations moving between the RF coverage areas of AP1 304 and AP2 334. The overlapping RF coverage area of AP1 304 and AP2 334 is pictorially represented by the dashed overlap region. The overlapping RF coverage area is referred to herein as overlap basic service area (OBSA) 362.

Stations STA1-1 306, STA1-2 308, STA2-1 336, and STA2-2 338 are positioned within OBSA 362 and may compete for the same channel. AP1 304 coordinates the transmission of its member stations, STA1-1 306-STA1-4 312, via EDCA. Similarly, AP2 334 coordinates the transmission of its member stations, STA2-1 336-STA2-4 342, via EDCA. In general, however, there is no coordination between AP1 304 and AP2 334, and channel access by stations within OBSA 362 are not fully coordinated. For example, AP1 304 may assign higher priority to voice traffic from STA1-1 306 than to video traffic from STA1-2 308. Similarly, AP2 334 may assign higher priority to voice traffic from STA2-1 336 than to video traffic from STA2-2 338. In the IEEE 802.11 standards, however, there is no mechanism for assigning different priority between traffic from STA1-1 306 and traffic from STA2-1 336. If the EDCA parameters for BSS1 302 and BSS2 332 are equal, for example, a traffic stream in BSS1 302 with AC=Voice will compete on the same statistical basis as a traffic stream in BSS2 332 with AC=Voice. Furthermore, since there is a wide range of EDCA parameters, and since EDCA parameters may be independently set for each BSS, it is possible for a high-priority traffic stream in BSS1 302 (for example, AC=Voice) to compete on the same statistical basis as a lower priority traffic stream in BSS2 332 (for example, AC=Video).

In an embodiment of the invention, the operations of AP1 304 and AP2 334 are coordinated. In a strongly overlapping OBSA, AP1 304 and AP2 334 are located within OBSA 362 and may communicate with each other over the RF channel. A protocol allows one AP to act as the master and control the other AP. For example, AP1 304 may be assigned as the master and send control messages to AP2 334. One skilled in the art may develop appropriate protocols for assigning the master AP. For example, the AP with the lower network identification number (such as MAC address) may become the master.

In a weakly overlapping OBSA, the two APs are not located within OBSA 362 and may not communicate with each other directly over the RF channel. This network configuration is shown in FIG. 3. In an embodiment of the invention, manager 380 controls operation of AP1 304 and AP2 334. This scheme is described in U.S. patent application Ser. No. 11/999,302, which is incorporated by reference herein in its entirety. Manager 380 may communicate with AP1 304 and AP2 334 via distribution system DS 370. Manager 380 may also connect to packet data network 390. In the example shown, DS 370 is a wired infrastructure distribution system (for example, an Ethernet LAN). DS 370, however, may also be a WLAN (either over the common RF channel or over a separate control channel). One skilled in the art may design distribution systems adapted to the network of interest; for example, free-space optics may be used.

Manager 380 may be a computer or server running network management software. Manager 380 may configure the EDCA parameters for BSS1 302 and BSS2 332 such that traffic streams in one BSS has higher priority than traffic streams in the other BSS. In the examples discussed below, manager 380 configures the EDCA parameters such that traffic streams in BSS1 302 have a higher priority than traffic streams in BSS2 332. Thus, in OBSA 362, if STA1-2 308 and STA2-1 336 are competing for the channel, STA1-2 308 will be assigned higher priority than STA2-1 336. One skilled in the art may develop and apply fairness algorithms to switch higher priority between BSS1 302 and BSS2 332.

An EDCA parameter set is transmitted from an AP to its associated members via information elements in a beacon frame, or other management frames, such as probe response and association response frames. In one embodiment of the invention, the EDCA parameter set is transmitted in standard beacon frames; and the beacon frames from AP1 304 and the beacon frames from AP2 334 are synchronized. In another embodiment of the invention, EDCA parameters are transmitted in a new channel access throttling frame (CF).

Figure 4:
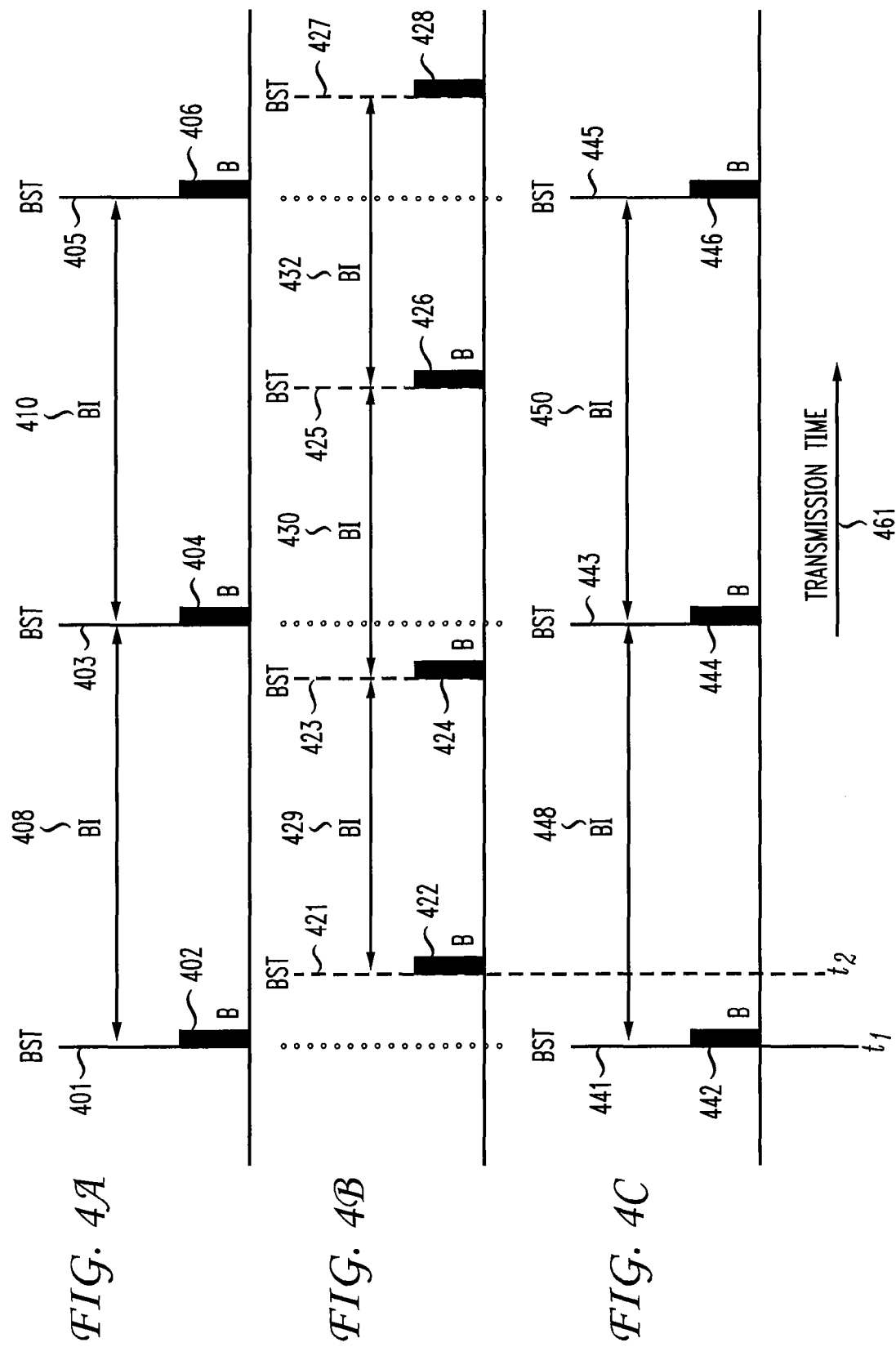
FIG. 4A-FIG. 4C show a high-level schematic of transmission sequences for two access points.

A beacon (also referred to herein as a beacon message) carries beacon information. Beacon information includes timing information and key operational parameters, including the EDCA parameter set, supported in the BSS associated with a specific AP. An STA resets its configuration according to the parameters specified in the received beacon. Beacons are transmitted periodically from the AP to update parameters. FIG. 4A-FIG. 4C show pictorial representations of data transmission sequences from AP1 304 and AP2 334. The transmission time 461 represents the transmission time relative to a common reference, such as the radio clock of a specific AP. Transmission time increases from left to right. FIG. 4A shows two consecutive beacon intervals, BI 408 and BI 410, transmitted by AP1 304 to all stations within BSS1 302. Beacon interval BI 408 is delimited by beacon start time (BST) 401 and beacon start time BST 403. Beacon interval BI 410 is delimited by BST 403 and BST 405. Beacon start times BST 401, BST 403, and BST 405 are the target times to start transmission of beacons B 402, B404, and B406, respectively. Beacon start times are referred to as target beacon transmission times because traffic congestion (and other reasons) may cause statistical variation in the actual transmission time; however, the BSTs are precisely period according to the beacon interval of the BSS. The length of a beacon interval is a configurable parameter and may be updated. Between updates, the length of a beacon interval is nominally constant. Devices external to a BSS may learn the BSTs by observing the actual starting time of beacon transmissions. On a periodic basis, the earliest observed beacon transmission starting time approaches the BST.

FIG. 4B shows three consecutive beacon intervals, BI 428-BI 432, transmitted by AP2 334 to all stations within BSS2 332. Beacon interval BI 428 is delimited by BST 421 and BST 423. Beacon interval BI 430 is delimited by BST 423 and BST 425. Beacon interval BI 432 is delimited by BST 425 and BST 427. Beacon start times BST 421, BST 423, BST 425, and BST 427 refer to the target beacon transmission times of beacons B 422, B 424, B 426, and B 428, respectively.

Both the beacon start time and the beacon interval of beacons transmitted by AP2 334 may differ from the corresponding values of beacons transmitted by AP1 304. With respect to B 402-B 406 transmitted by AP1 304, BST 401 is designated the reference value $t_1$. In this example, BI 408 and BI 410 are equal, BI 408=BI 410=$BI_1$. Similarly, with respect to B 422-B 428 transmitted by AP2 334, BST 421 is designated the value $t_2$. In this example, BI 428-BI 432 are equal, BI 428=BI 430=BI 432=$BI_2$. Relative to the beacon start time BST 401 of B 402, the beacon start time BST 421 of B 422 is retarded by the retardation interval $\Delta t = t_2 - t_1$. The difference between $BI_1$ and $BI_2$ is designated $\Delta BI = BI_2 - BI_1$.

Figure 5:
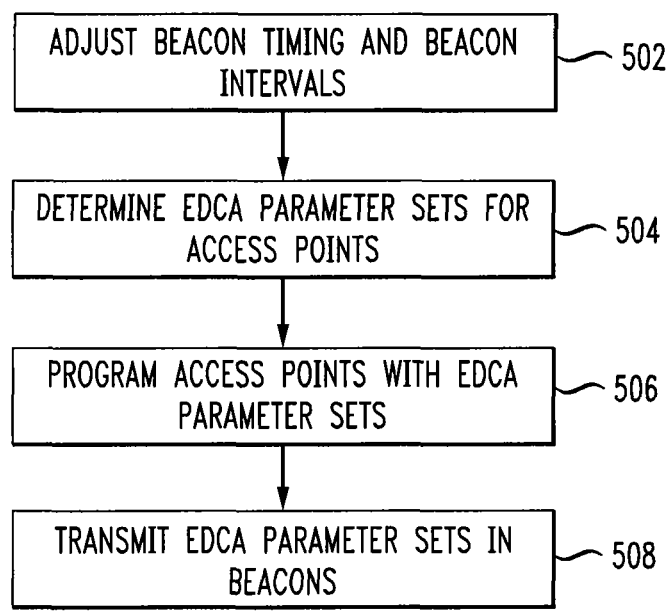
FIG. 5 shows a flowchart of a method for assigning priority via an enhanced distributed channel access parameter set transmitted in beacons.

One embodiment of the invention is described by the flowchart shown in FIG. 5. In step 502, the beacon start time BST 421 and the beacon intervals, BI 428-BI 432, associated with AP2 334 are adjusted such that $\Delta t = 0$ and $\Delta BI = 0$. The adjusted transmission sequence from AP2 334 is shown in FIG. 4C.

Beacon interval BI 448 is delimited by BST 441 and BST 443. Beacon interval BI 450 is delimited by BST 443 and BST 445. Beacon start times BST 441, BST 443, and BST 445 refer to the target beacon transmission times of beacons B 442, B 444, and B 446, respectively.

The adjustment procedure uses the method described in U.S. patent application Ser. No. 11/999,302. Referring back to FIG. 3, monitor station STA0 350 is located within OBSA 362. Monitor station STA0 350 detects transmissions, including beacon frames, from both AP1 304 and AP2 334. From these frames, the values $t_1$, $t_2$, $BI_1$, and $BI_2$ may be determined. Manager 380 then issues control messages to AP2 334 to adjust its values of $t_2$ and $BI_2$ such that $\Delta t=0$ and $\Delta BI=0$. Note that manager 380 may also issue control messages to AP1 304 to adjust its values of $t_1$ and $BI_1$ as well. In general, $\Delta t$ and $\Delta BI$ may be set to specified values, which are not necessarily 0. The specified values, for example, may be calculated according to an algorithm executed by manager 380. The choice of $\Delta t$ should also accommodate the transmission time of beacon messages from AP1 304. To simplify the present example, values of 0 are used.

The process then passes to step 504. Manager 380 determines the EDCA parameters (CWmin, CWmax, AIFSN [AC]) for AP1 304 and AP2 334. The EDCA parameters, for example, may be calculated according to an algorithm executed by manager 380. For the example shown in FIG. 5, assume that STA1-2 308 and STA2-1 336 both want to transmit a voice stream (AC=AC_VO); and further assume that manager 380 decides that STA1-2 308 should have higher priority. In this example, the EDCA parameters for both BSS1 302 and BSS2 332 are initially set at CWmin=3, CWmax=7, and AIFSN[AC_VO]=2. To grant higher priority to STA1-2 308, manager 380 retains the initial EDCA parameter values for BSS1 302. Manager 380, however, increases the EDCA parameters to the values (CWmin=1023, CWmax=1023, and AIFSN[AC_VO]=7) for BSS2 332. In step 506, manager 380 programs AP1 304 and AP2 334 with their respective EDCA parameter values. In step 508, AP1 304 transmits its EDCA parameters via beacon B 402 to the member stations (STA1-1 306-STA1-4 312) in BSS1 302; and AP2 334 transmits its EDCA parameters via beacon B 442 to the member stations (STA2-1 336-STA2-4 342) in BSS2 332. The EDCA parameters remain in force until they are reset by new values transmitted by a later beacon or other management message.

Note that the steps in the flowchart shown in FIG. 5 may also be performed in a strongly overlapping OBSA, except the EDCA parameters may be determined and assigned by a master AP instead of a monitor station and a manager.

One skilled in the art may develop and apply fairness algorithms for switching priority between BSS1 302 and BSS2 332 on a time sharing basis. In the example described above, in which $\Delta t=0$ and $\Delta BI=0$, priority between BSS1 302 and BSS2 332 may be alternated during consecutive beacon intervals. In general, priority between BSS1 302 and BSS2 332 may be allocated dynamically, depending on traffic conditions. More complex allocation schemes may be developed for instances in which $\Delta t$ and $\Delta BI$ are not equal to 0. As noted above, QoS may also depend on the value of TXOP Limit, which specifies how long an STA may continue to transmit once it has acquired the channel. This parameter may also be specified as part of the EDCA parameter set transmitted in a beacon from an AP to its associated member STAs.

In the embodiments discussed above, priority between BSSs in an OBSA are controlled by EDCA parameter sets transmitted in standard IEEE 802.11 beacons. A beacon, however, broadcasts the same EDCA parameter set to all associated member STAs in a BSS. Referring back to FIG. 3, for example, STA1-1 306-STA1-4 312 receive a common EDCA parameter set from AP1 304. Similarly, STA 2-1 336-STA2-4 342 receive a common EDCA parameter set from AP2 334. (The EDCA parameter set transmitted by AP1 304 may differ from the EDCA parameter set transmitted by AP2 334.) Consequently, transmission from STAs not located within OBSA 362 may be adversely affected. Referring back to the example above discussed with respect to FIG. 5, the EDCA parameters are set at CWmin=3, CWmax=7, and AIFSN[AC_VO]=2 for BSS1 302; and the EDCA parameters are set at CWmin=1023, CWmax=1023, and AIFSN [AC_VO]=7 for BSS2 332 to grant higher priority to STA1-1 306 and STA1-2 308 over STA2-1 336 and STA2-2 338, which are located within OBSA 362. The EDCA parameters for STA2-3 340 and STA2-4 342, which are not located within OBSA 362, are also set at CWmin=1023, CWmax=1023, and AIFSN[AC_VO]=7. Consequently, transmission from STA2-3 340 and STA2-4 342 may be unnecessarily delayed, and QoS may be degraded for some traffic streams.

Another embodiment of the invention uses a new control frame, referred to herein as a channel access throttling (CAT) frame. A CAT frame (CF) provides finer granularity in priority access control. In particular, an EDCA parameter set may be assigned on a per-STA basis, instead of being assigned on a per-BSS basis. STAs within an OBSA may be identified because they receive beacons, and other management frames, from multiple APs. An STA may report back to its associated AP that it is receiving beacons from other APs. In an embodiment, an STA may report back to its associated AP the network identifiers of the other APs from which it is receiving beacons.

A CF may contain the following fields:

A "start time" field that indicates when the CAT period being described by the CF shall start. This field may be encoded as a clock time or as an offset from the reception time of the CF. The omission of this field or a special value such as 0 indicates that the CAT period begins immediately after the reception of the CF. Herein, a start time for new values of parameters or parameter set refers to the time at which a STA operates with the new values of the parameters or parameter set.

An "expiration time" field indicates when the configurations (as specified by values of a parameter or parameter set) provided by this CF expire, and all member stations should roll back to their original configurations prior to receiving the CF. This field may be encoded as a clock time or as an offset from the reception time of the CF. A special "expiration time" value such as 0 indicates that the configuration will be retained until it is modified by a newer CF, beacon, or other management frames which contain an EDCA parameter set.

A "count" field indicates how many previous CFs have been sent by the AP. This field shows the freshness of the configurations that the CF carries.

A "size" field indicates how many per-STA CAT configuration entries there are in the CF.

A list of per-STA CF configuration entries (the size of the list matches the "size" field):
  (a) Each per-node CAT configuration entry contains an identifier field and a set of EDCA parameters. The identifier specifies which station or set of stations the EDCA parameters apply to. More specifics regarding the identifier are provided below.
  (b) In an embodiment, the CF may use the existing EDCA Parameter set Information Element (Element ID 12) specified by the IEEE 802.11 standards to carry per-STA CAT configurations.

One skilled in the art may provision additional configuration fields (that is, fields in addition to standard EDCA parameters) to adapt the CF to specific network applications.

Herein, the information in a CF is transmitted by an access point to a member station via a CAT message. Upon receiving a CAT message, a specific station may immediately comply by setting its configuration parameters (EDCA parameter set and additional configuration parameters) to those specified in the CF, if the CAT message containing configuration parameters applies to the specific station. This update process is different from the process specified by the current IEEE 802.11 standards for updating EDCA parameters when a station receives a message carrying an EDCA parameter set. The existing update process may require that the EDCA parameters be updated at a specific time within a beacon interval (the time may be specified within the EDCA parameter set). This delay may be problematic if it is necessary to apply the new EDCA parameters immediately. In contrast, the corresponding EDCA parameter update process may be completed immediately following the reception of the CF.

The set of configuration parameters that a specific station uses may be identified by identifiers carried in the CF. One skilled in the art may develop appropriate identifiers. For example, in one embodiment, a method similar to that of the "longest match" in an Internet Protocol (IP) destination address based routing scheme may be used, except that matching is done over MAC addresses instead of IP addresses. That is, a station may search for the most specific entry that applies. For example, a station may first search for a CAT configuration entry addressed to its specific address. If it finds one, it then uses that CAT configuration entry. If it does not find one, it may then search for a CAT configuration entry addressed to a group address corresponding to a group in which the station is a member. If it finds one, it then uses that CAT configuration entry. If it does not find one, it may then search for a CAT configuration entry addressed to all stations in the BSS. After locating the appropriate CAT configuration entry, a station may first record its current configuration parameters so that, after the end of the CAT period, it may roll back its configurations if desired. The station then updates its configurations according to the CAT configuration entry specified in the CF.

In another embodiment, the "Association ID" (2 bytes) of the STAs within a BSS may be used in place of the MAC address (6 bytes) to save the number of bits used. A bitmap based on the Association ID that is similar to the "Partial Virtual Bitmap" used by the standard IEEE 802.11 Traffic Indicator Map information element (or a compressed variation of the information element), may also be used.

Figure 6:
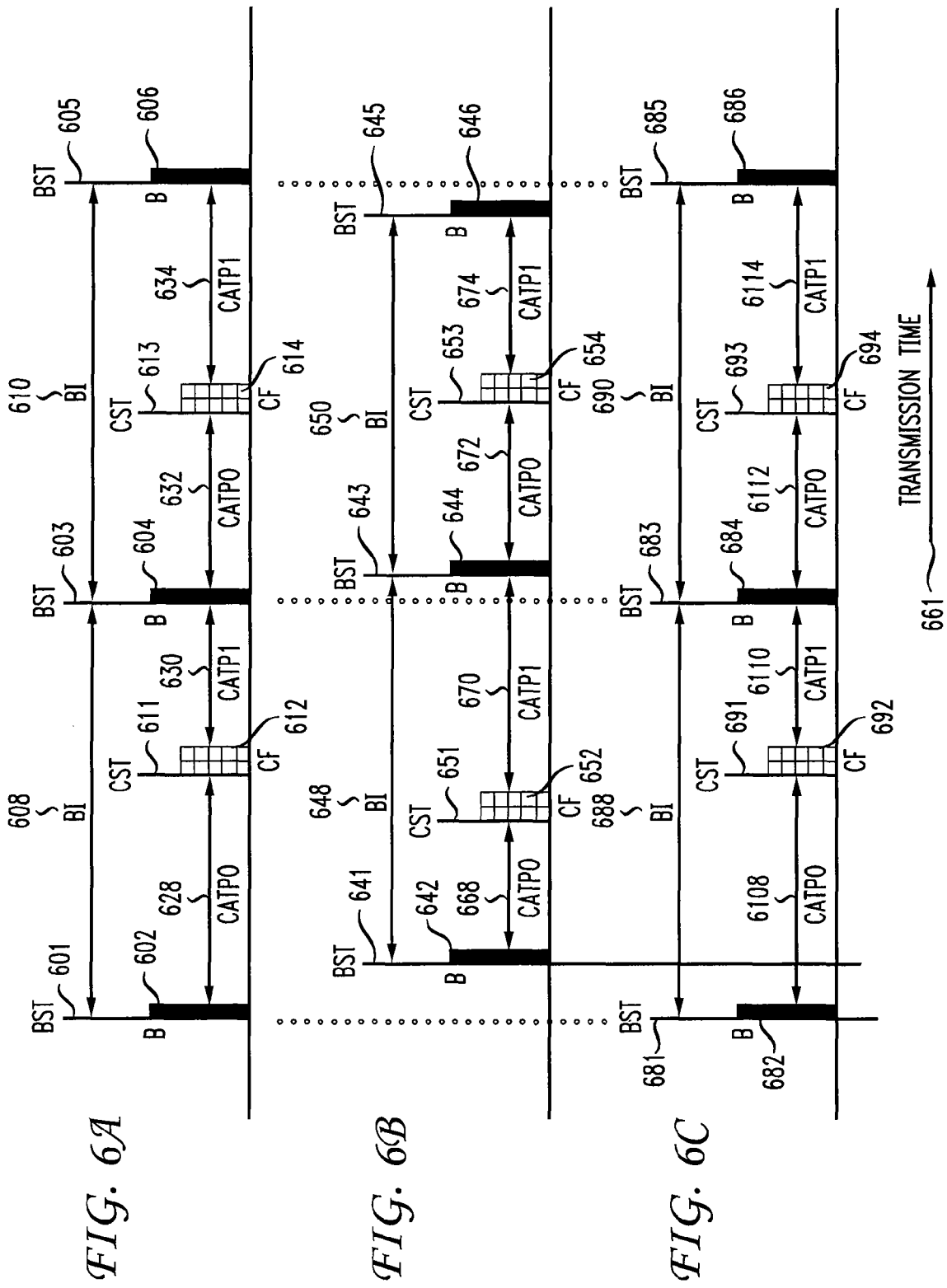
FIG. 6A-FIG. 6C show high-level schematics of transmission sequences including channel access throttling frames.

FIG. 6A-FIG. 6C show pictorial representations of the data transmission sequences from AP1 304 and AP2 334. The transmission time 661 represents the transmission time relative to a common reference, such as the radio clock of a specific AP. Transmission time increases from left to right. FIG. 6A shows two consecutive beacon intervals, BI 608 and BI 610, transmitted by AP1 304 to all stations within BSS1 302. Beacon interval BI 608 is delimited by BST 601 and BST 603. Beacon interval 610 is delimited by BST 603 and BST 605. Beacon start times BST 601, BST 603, and BST 605 refer to the target beacon transmission times of beacons B 602-B 604, and B 606, respectively.

CAT frame CF 612 is transmitted within beacon interval BI 608 and divides BI 608 into two CAT periods. CATP0 628 is the interval between the end of B 602 and the start time CST 611 of CF 612. CATP1 630 is the interval between the end of CF 612 and the start time BST 603 of the next beacon B 604. Similarly, CAT frame CF 614 is transmitted within beacon interval BI 610 and divides BI 610 into two CAT periods. CATP0 632 is the interval between the end of B 604 and the start time CST 613 of CF 614. CATP1 634 is the interval between the end of CF 614 and the start time BST 605 of the next beacon B 606. In general, the length of a beacon interval, the length of CATP0, and the length of CATP1 may vary from one beacon interval to another. Referring to BI 608, the EDCA parameter set governing transmission during CATP0 628 is the EDCA parameter set specified in B 602. The EDCA parameter set governing transmission during CATP1 630 is the EDCA parameter set specified in CF 612. Similarly, referring to BI 610, the EDCA parameter set governing transmission during CATP0 632 is the EDCA parameter set specified in B 604. The EDCA parameter set governing transmission during CATP1 634 is the EDCA parameter set specified in CF 614. In an embodiment, a CF does not need to be transmitted within every BI. A CF may be transmitted only when necessary.

FIG. 6B shows two consecutive beacon intervals, BI 648 and BI 650, transmitted by AP2 334 to all stations within BSS2 332. Beacon interval BI 648 is delimited by BST 641 and BST 643. Beacon interval BI 650 is delimited by BST 643 and BST 645. Beacon start times BST 641, BST 643, and BST 645 refer to the target beacon transmission times of beacons B 642, B 644, and B 646, respectively.

CAT frame CF 652 is transmitted within beacon interval BI 648 and divides BI 648 into two CAT periods. CATP0 668 is the interval between the end of B 642 and the start time CST 651 of CF 652. CATP1 670 is the interval between the end of CF 652 and the start time BST 643 of the next beacon B 644. Similarly, CAT frame CF 654 is transmitted within beacon interval BI 650 and divides BI 650 into two CAT periods. CATP0 672 is the interval between the end of B 644 and the start time CST 653 of CF 654. CATP1 674 is the interval between the end of CF 654 and the start time BST 645 of the next beacon B 646. Referring to BI 648, the EDCA parameter set governing transmission during CATP0 668 is the EDCA parameter set specified in B 642. The EDCA parameter set governing transmission during CATP1 670 is the EDCA parameter set specified in CF 652. Similarly, referring to BI 650, the EDCA parameter set governing transmission during CATP0 672 is the EDCA parameter set specified in B 644. The EDCA parameter set governing transmission during CATP1 674 is the EDCA parameter set specified in CF 654.

In the examples shown in FIG. 6A-FIG. 6C, only one CAT frame is transmitted within a single beacon interval. In general, more than one CAT frame may be transmitted within a single beacon interval to provision more than two CAT periods within a single beacon interval.

In an embodiment of the invention, parameters specified in the fields of a CAT frame may be embedded as information elements in a beacon. Herein, CAT parameters embedded in beacons are referred to as embedded CAT information elements. The embedded CAT information elements include the parameters in a CAT frame that are not included in the standard IEEE 802.11 beacon. Embedded CAT information elements, for example, may specify the start time and expiration time of a CAT period within the beacon interval following the beacon carrying the embedded CAT information elements. Herein, the beacon interval following a specific beacon is referred to as the subsequent beacon interval. Other parameters include size and count. As discussed above, the EDCA parameter set carried in a standard beacon is applied to all member stations of a BSS. Embedded CAT information elements, however, may specify an EDCA parameter set on a per-STA or per-group basis. Embedded CAT information elements may provision more than two CAT periods within a subsequent beacon interval. Note that, depending on the application, both embedded CAT information elements and CAT frames may be used in combination.

The start time and expiration time of each CAT period may be specified relative to the beacon start time and beacon interval. For example, a CAT period may start at ⅓ of a beacon interval after the beacon start time and expire at ⅔ of a beacon interval after the beacon start time. That is, EDCA parameters may be configured for a first set of values during the first third of the beacon interval, for a second set of values during the second third of the beacon interval, and for a third set of values during the last third of the beacon interval.

Figure 7:
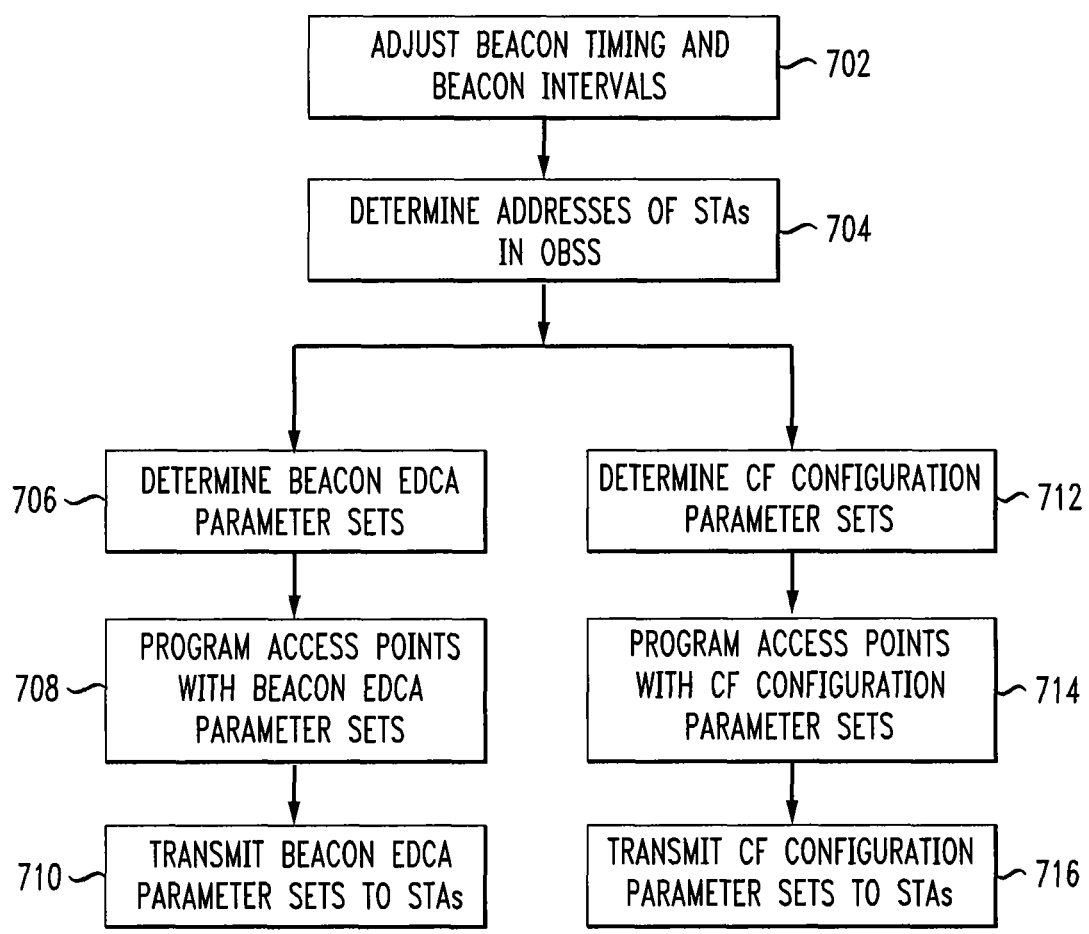
FIG. 7 shows a flowchart of a method for assigning priority via an enhanced distributed channel access parameter set transmitted in channel access throttling frames.

An embodiment of the invention using CAT frames is described by the flowchart shown in FIG. 7. The weakly overlapping OBSA shown in FIG. 3 is used as an example. One skilled in the art may apply similar steps for a strongly overlapping OBSA. In step 702, the beacon start time BST 641 and the beacon intervals, BI 648-BI 650, associated with AP2 334 are adjusted such that the retardation time Δt=0 and ΔBI=0. The adjustment procedure is similar to the one discussed above with respect to step 502 in FIG. 5. The adjusted transmission sequence from AP2 334 is shown in FIG. 6C. Beacon interval BI 688 is delimited by BST 681 and BST 683. Beacon interval BI 690 is delimited by BST 683 and BST 685. Beacon start times BST 681, BST 683, and BST 685 refer to the target beacon transmission times of beacons B 682, B 684, and B 686, respectively. In this example, the beacon intervals have been all set to the same value, BI 608=BI 610=BI 648=BI 650=BI. Similarly, the CAT periods have been set such that CATP0 628=CATP0 632=CATP0 6108=CATP0 6112=CATP0. Since the beacon intervals are all equal, it also follows that CATP1 630=CATP1 634=CATP1 6110=CATP1 6114=CATP1.

The process then passes to step 704. Manager 380 determines the addresses of STAs within the OBSA. Referring back to FIG. 3, STA1-1 306, STA1-2 308, STA2-1 336, and STA2-2 338 are located within OBSA 362. The process then passes to step 706 and step 712. In step 706, manager 380 determines the beacon EDCA parameter sets. In step 708, manager 380 programs AP1 304 and AP2 334 with their corresponding beacon EDCA parameter sets. In step 710, AP1 304 transmits its corresponding beacon EDCA parameter sets to its member STAs (STA1-1 306-STA1-4 312). Similarly, AP2 334 transmits its corresponding beacon EDCA parameter sets to its member STAs (STA2-1 336-STA2-4 342). In this example, the EDCA parameter set during CATP0 628 is the EDCA parameter set transmitted by beacon B 602. Similarly, the EDCA parameter set during CATP0 6108 is the EDCA parameter set transmitted by beacon B 682. In this example, assume that the EDCA parameter set transmitted by B 602 is the same as the EDCA parameter set transmitted by B 682. Following the previous example discussed with respect to FIG. 5, the EDCA parameters for AC=Voice are CWmin=3, CWmax=7, and AIFSN[AC_VO]=2. Consequently, STA1-1 306, STA1-2 308, STA2-1 336, and STA2-2 338, located within OBSA 362, have the same priority during the interval CATP0 628=CATP0 6108=CATP0.

Returning to step 712, manager 380 determines the CF configuration parameter sets on a per-STA basis. In this example, during CATP1 630=CATP1 6110=CATP1, higher priority is granted to STA1-1 306 and STA1-2 308 over STA2-1 336 and STA2-2 338. CF 612 sets the EDCA parameters to CWmin=2, CWmax=6, and AIFSN[AC_VO]=2 for STA1-1 306 and STA1-2 308 over the interval CATP1 630.

Similarly, CF 692 sets the EDCA parameters to CWmin=1023, CWmax=1023, and AIFSN[AC_VO]=7 for STA2-1 336 and STA2-2 338 over the corresponding interval CATP1 6110. Other schemes may be used. For example, if CF 612 is not transmitted, the values CWmin=3, CWmax=7, and AIFSN[AC_VO]=2 are retained by STA1-1 306 and STA1-2 308 over the interval CATP1 630 because those are the parameters established by the immediately previous beacon B 602. The CFs addressed to STAs not located within OBSA 362 (STA1-3 310, STA1-4 312, STA2-3 340, and STA2-4 342) maintain the EDCA parameters at CWmin=3, CWmax=7, and AIFSN[AC_VO]=2, again because those are the parameters established by the immediately previous beacons B 602 and B 682. In step 708, manager 380 programs AP1 304 and AP2 334 with their respective beacon CF configuration parameter sets. In step 710, AP1 304 transmits its CF configuration parameter set via CF 612 to the member stations (STA1-1 306-STA1-4 312) in BSS1 302. Similarly, AP2 334 transmits its CF configuration parameter set via CF 692 to the member stations (STA2-1 336-STA2-4 342) in BSS2 332.

In the example shown in FIG. 7, step 706-step 710 for processing the beacon EDCA parameter sets proceed independently of step 712-716 for processing the CF configuration parameter sets. One skilled in the art may develop algorithms for processing the beacon EDCA parameter sets and CF configuration parameter sets according to specific traffic conditions. For example, step 706 and step 712 may be combined, step 708 and step 714 may be combined, and step 710 and step 716 may be combined. As discussed above, one skilled in the art may develop algorithms for controlling QoS within an OBSA, wherein the algorithms depend on at least one of the following parameters: clock offset between APs, start time of a beacon, beacon interval, CATP0, CATP1, beacon EDCA parameter set, CF configuration parameter set, number of stations in the OBSA, and specific traffic conditions. Note that all of these parameters may be dynamically varied and independently set on either a per-BSS or per-STA basis.

FIG. 3 illustrates an embodiment of the invention applied to a network configuration in which OBSA 362 is formed by the overlap of two BSSs (BSS1 302 and BSS2 332). One skilled in the art may develop embodiments which may be applied to a network configuration in which an OBSA is formed by the overlap of three or more BSSs. In a strongly overlapping OBSA in which three or more APs are located within the OBSA, a specific AP may be designated as the master following a user-defined protocol (such as a rule or negotiation mechanism). In a weakly overlapping OBSA, a monitor station may receive RF transmissions (such as beacons) from three or more APs. A manager may then control the synchronization of beacons and the length of beacon intervals for all BSSs in the overlap OBSA. EDCA parameters may then be assigned on a per BSS, per group, or per STA basis by the master AP (for a strongly overlapping OBSA) or the manager (for a weakly overlapping OBSA) via beacons and CAT frames.

If priority is set on a BSS basis, EDCA parameters should be set such that only one BSS has high priority at any particular instant. If more than one BSS has high priority at any particular instant, then the probability of collisions between stations in the high-priority BSSs may increase, and channel utilization may decrease. Similar considerations apply if priority is set on a group basis.

Channel access throttling provides a mechanism for granting high priority to a specific BSS when multiple BSSs overlap in an overlap BSA. On an overall system-wide level, a mechanism for managing fairness (allocation of priority among the multiple BSSs over a time interval) is advantageous. That is, a specific BSS should not be granted high priority for an excessive period of time, and a specific BSS should not be relegated to low priority for an excessive period of time. What constitutes an excessive period of time is dependent on the system configuration, applications, and traffic streams.

In an embodiment of the invention, priority is managed in time intervals referred to herein as channel access throttling durations (CATDs). A CATD is a time interval during which channel access parameters remain constant. During a specific CATD, if a specific BSS has higher channel access priority than the other BSSs (which overlap in an overlap BSA), the BSS with the highest priority is in a high CATD state. Herein, the BSS with the highest priority is also referred to as the high CATD BSS. Relative to the high CATD BSS, the other BSSs all have considerably lower probability for channel access. Relative to each other, the other BSSs may have different channel access parameters and, hence, different channel access priorities. The different channel access priorities among the other BSSs are of consequence when the high CATD BSS has no traffic to send.

In one embodiment for managing priority among multiple BSSs, there are two priority states, high access priority and low access priority. One skilled in the art may develop embodiments for a user-specified number of priority states (for example, high, medium, low). As discussed above, at any particular instant, only one BSS should be in a high CATD state. FIG. 9A shows an example for managing priority between two BSSs, BSS1 and BSS2. Time sequence 902 represents the CATD distribution for BSS1. Time sequence 922 represents the CATD distribution for BSS2. The times in BSS1 and BSS2 are referenced to a common clock and are labelled $t_i$. From $t_1$ to $t_2$, BSS1 is in the high CATD1 state 904, and it has a higher channel access priority than BSS2. From $t_2$ to $t_3$, BSS1 and BSS2 have the same channel access priority, and they compete for channel access on an equal basis. From $t_3$ to $t_4$, BSS2 is in the high CATD2 state 924, and it has higher channel access priority than BSS1. From $t_4$ to $t_5$, BSS1 and BSS2 have the same channel access priority, and they compete for channel access on an equal basis. The sequence then repeats from $t_5$ on.

Herein, a repeated sequence of CATDs is referred to as a schedule. For example, in FIG. 9A, the schedule covers the transmission sequence from $t_1$ to $t_5$. The duration of the schedule is referred to as the schedule length. By controlling when a specific BSS has a high CATD state, and by controlling the length of a high CATD, different schedules may be constructed for different system configurations, applications, and traffic streams. Schedules may be repeated as long as necessary. In the example shown in FIG. 9B, a schedule supports proportional allocation of transmission time among BSSs by configuring the lengths of the high CATDs assigned to each specific BSS within the schedule. Here, high priority alternates between BSS1 and BSS2, except the length of the high CATD for BSS1 is twice as long as the length of the high CATD for BSS2. Referring to time sequence 962, BSS2 is in the high CATD2 state 964 from $t_1$ to $t_2$. Referring to time sequence 942, BSS1 is in the high CATD1 state 944 from $t_2$ to $t_3$. BSS2 is in the high CATD2 state 966 from $t_3$ to $t_4$. The length of high CATD1 is twice as long as the length of high CATD2. In FIG. 9A, the schedule covers the transmission sequence from $t_1$ to $t_3$.

Another factor in configuring schedules is the transmission of other management messages, such as beacons. In an advantageous embodiment, for a specific (first) BSS, the beacon start time (target beacon transmission time) falls within the high CATD for that BSS. If the beacon start time of the first BSS falls within the high CATD of a second BSS, transmissions of beacon messages in first OBSS are likely to be delayed by transmissions in the second BSS because the second BSS has higher channel access priority. For accommodating beacon messages, it is advantageous to have schedule lengths correlated to beacon intervals. For example, a schedule length may be equal to a beacon interval or equal to an integer multiple of a beacon interval. As another example, if a schedule length is shorter than a beacon interval, the beacon interval may be an integer number of schedule lengths.

Figure 10:
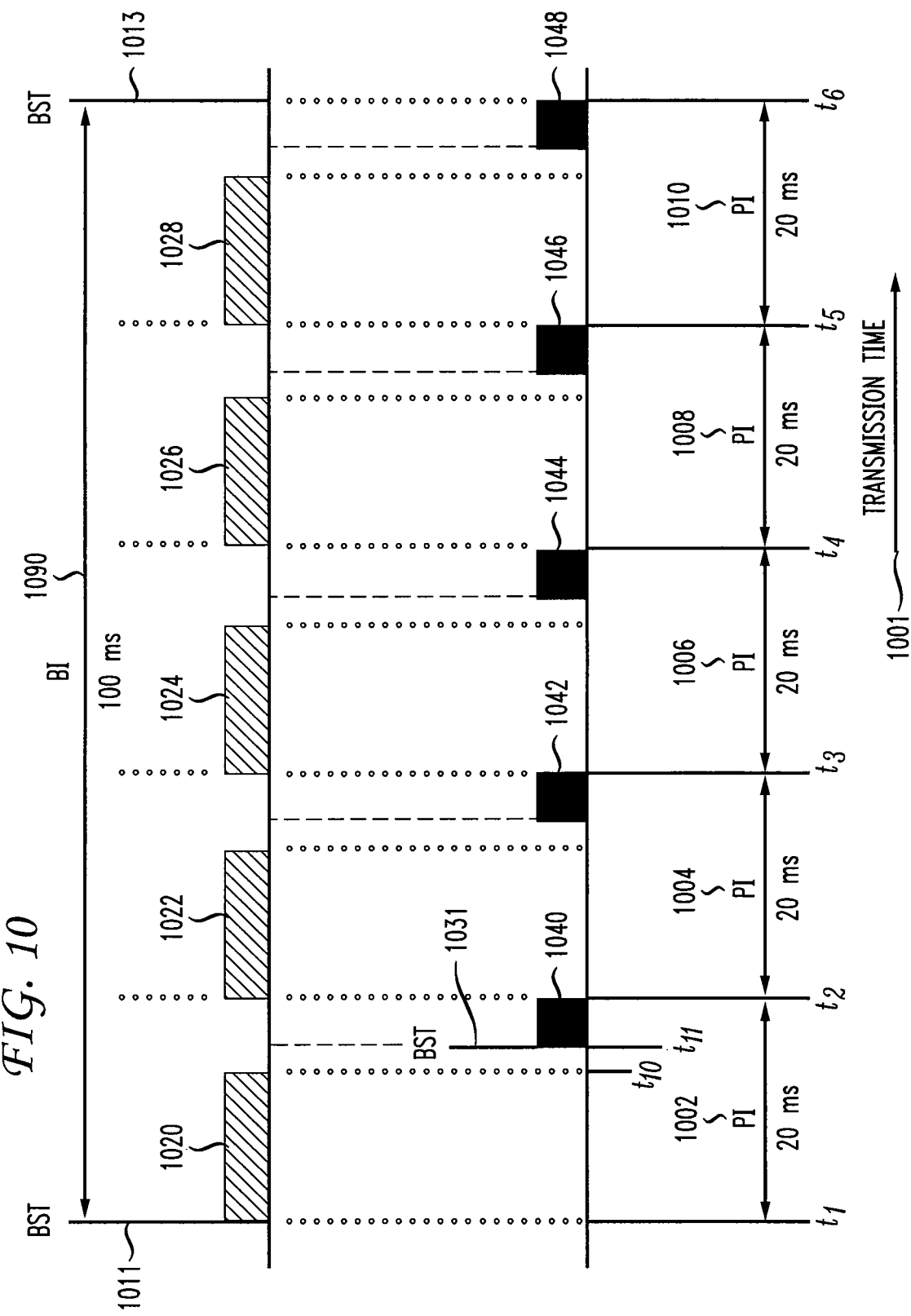
FIG. 10 shows a high-level schematic of a transmission sequence for Voice-over-IP packets.

Short schedules may be used to accommodate transmissions with tight delay bounds (such as Voice-over-IP (VoIP) transmissions). Many VoIP applications generate packets at 10 or 20 ms intervals. Thus, it is advantageous for a schedule to provide at least one high CATD for every packet generation interval to the BSSs with VoIP traffic. FIG. 10 shows an example of a schedule for two BSSs, BSS1 and BSS2, that carry VoIP calls. The horizontal axis represents the transmission time 1001. Beacon start times BST 1011 ($t_1$) and BST 1013 ($t_6$) are consecutive beacon start times in BSS1. They delimit beacon interval BI 1090. In this example, the length of BI 1090 is 100 ms. The interval between packet transmissions is referred to as a packet interval (PI). Shown are five consecutive packet intervals, PI 1002-PI 1010, delimited by the times $t_1$-$t_6$. In this example, the length of a PI is 20 ms. Therefore, the length of BI 1090 is equal to the length of five PIs. Beacon start time BST 1031 ($t_{11}$) is a beacon start time in BSS2.

In BSS1, consecutive high CATDs are referenced as high CATD1 1020-high CATD1 1028. In BSS2, consecutive high CATDs are referenced as high CATD2 1040-high CATD2 1048. Short time intervals in which neither BSS1 nor BSS2 are in a high CATD state are provided as error margins or guard bands to accommodate unplanned transmissions. For example, BSS1 is in high CATD1 state 1020 from $t_1$ to $t_{10}$. Neither BSS1 nor BSS2 is in a high CATD state from $t_{10}$ to $t_{11}$. BSS2 is in high CATD2 state from $t_{11}$ to $t_2$.

One skilled in the art may develop various algorithms for configuring schedules based on parameters such as the number of stations in BSS1, number of stations in BSS2, priority of a traffic stream to be transmitted by a station in BSS1, priority of a traffic stream to be transmitted by a station in BSS2, previous priority of BSS1, and previous priority of BSS2. As discussed above, a specific BSS should not be granted high priority for an excessive period of time, and a specific BSS should not be relegated to low priority for an excessive period of time. Therefore, scheduling algorithms may take into account prior history.

Figure 8:
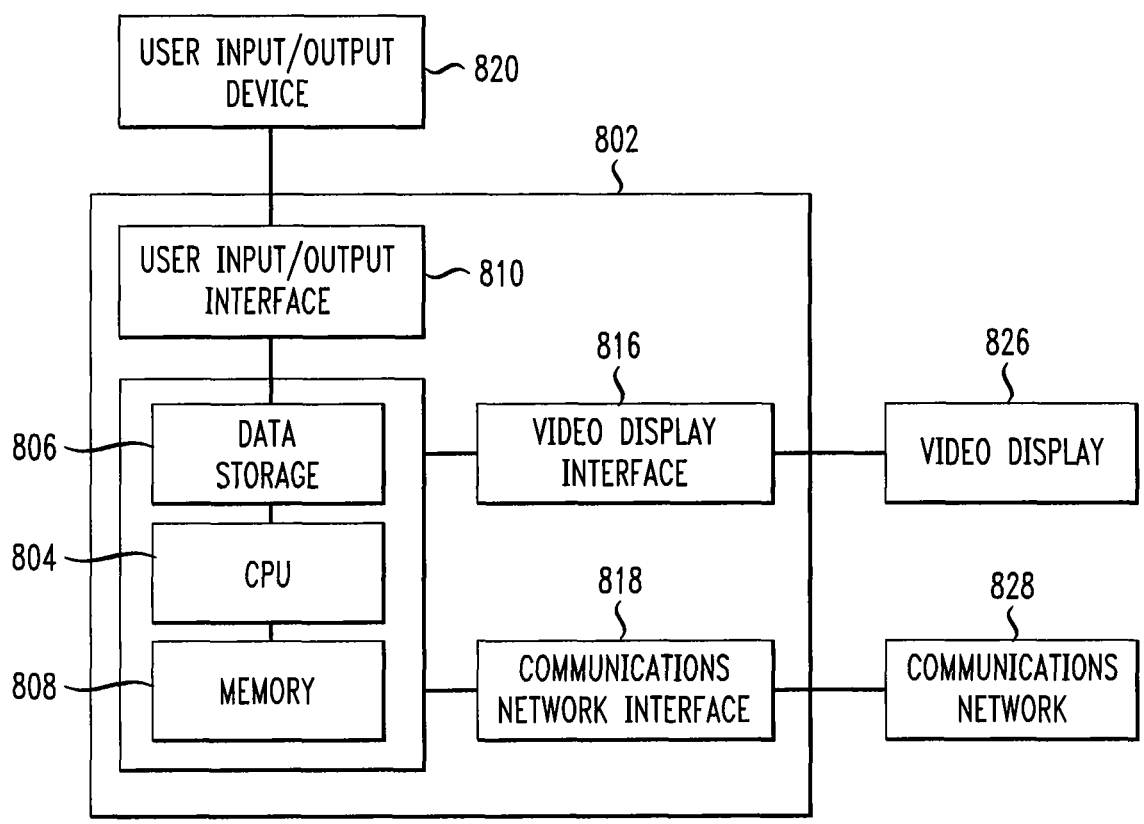
FIG. 8 shows a high-level schematic of a computer which may be used to execute a process for controlling access priority.

One embodiment of a manager 380 (FIG. 3) may be implemented using a computer. As shown in FIG. 8, computer 802 may be any type of well-known computer comprising a central processing unit (CPU) 804, memory 808, data storage device 806, and user input/output interface 810. Data storage device 806 may comprise a hard drive, non-volatile memory, or other computer readable medium (such as a magnetic disk or compact disc read only memory). User input/output interface 810 may comprise a connection to a user input/output device 820, such as a keyboard or mouse, which enable user interaction with computer 802.

As is well known, a computer operates under control of computer software which defines the overall operation of the computer and applications. CPU 804 controls the overall operation of the computer and applications by executing computer program instructions which define the overall operation and applications. The computer program instructions may be stored in data storage device 806 and loaded into memory 808 when execution of the program instructions is desired. The method steps of FIG. 5 or FIG. 7 may be defined by the computer program instructions stored in the memory 808 or in the data storage device 806 (or in a combination of memory 808 and data storage device 806) and controlled by the CPU 804 executing the computer program instructions. For example, the computer program instructions may be implemented as computer executable code programmed by one skilled in the art to perform algorithms implementing the method steps of FIG. 5 or FIG. 7. Accordingly, by executing the computer program instructions, the CPU 804 executes algorithms implementing the method steps of FIG. 5 or FIG. 7.

Computer 802 may further comprise a video display interface 816, which may transform signals from CPU 804 to signals which may drive video display 826. Computer 802 may further comprise one or more network interfaces. For example, communications network interface 818 may comprise a connection to an Internet Protocol (IP) communications network 828, which may transport user, control, and test traffic. For example, communications network interface 818 may connect to distribution system DS 370 or packet data network 390 in FIG. 3. One skilled in the art will recognize that an implementation of an actual computer may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, for controlling access priority to a radiofrequency (RF) channel between at least one first wireless device associated with a first wireless access point having a first RF coverage area and at least one second wireless device associated with a second wireless access point having a second RF coverage area, wherein said first RF coverage area and said second RF coverage area overlap in an overlap RF coverage area, wherein said at least one first wireless device and said at least one second wireless device are located within said overlap RF coverage area, and wherein said at least one first wireless device and said at least one second wireless device access said RF channel via a collision sense multiple access/collision avoidance (CSMA/CA) mechanism, said method comprising the steps of:
    transmitting to said at least one first wireless device a first message comprising a first set of lengths of first interframe spacings and a first set of maximum lengths of first contention windows; and
    transmitting to said at least one second wireless device a second message comprising a second set of lengths of second interframe spacings and a second set of maximum lengths of second contention windows;
    wherein said first set of lengths of first interframe spacings, said first set of maximum lengths of first contention windows, said second set of lengths of second interframe spacings, and said second set of maximum lengths of second contention windows are configured such that the probability of said at least one first wireless device accessing said RF channel is greater than the probability of said at least one second wireless device accessing said RF channel;
    wherein said step of transmitting to said at least one first wireless device a first message comprises the step of:
        transmitting a first channel access throttling frame comprising a first enhanced distributed channel access parameter set to said at least one
        first wireless device; and wherein said step of transmitting to said at least one second wireless device a second message comprises the step of:
        transmitting a second channel access throttling frame comprising a second enhanced distributed channel access parameter set to said at least one second wireless device.

2. The method of claim 1, wherein said first message is addressed to a specific station associated with said first wireless access point.

3. The method of claim 1, wherein said first message is addressed to a specific group of stations associated with said first wireless access point.

4. The method of claim 1, wherein said first message is addressed to all stations associated with said first wireless access point.

5. The method of claim 1, further comprising the steps of:
    transmitting to said at least one first wireless device a third message comprising a third set of lengths of third interframe spacings and a third set of maximum lengths of third contention windows; and
    transmitting to said at least one second wireless device a fourth message comprising a fourth set of lengths of fourth interframe spacings and a fourth set of maximum lengths of fourth contention windows;
    wherein said third set of lengths of third interframe spacings, said third set of maximum lengths of third contention windows, said fourth set of lengths of fourth interframe spacings, and said fourth set of maximum lengths of fourth contention windows are configured such that the probability of said at least one second wireless device accessing said RF channel is greater than the probability of said at least one first wireless device accessing said RF channel.

6. The method of claim 5, wherein:
    said first message further comprises a first start time and a first expiration time for said first set of lengths of first interframe spacings and said first set of maximum lengths of first contention windows;
    said second message further comprises a second start time and a second expiration time for said second set of lengths of second interframe spacings and said second set of maximum lengths of second contention windows;
    said third message further comprises a third start time and a third expiration time for said third set of lengths of third interframe spacings and said third set of maximum lengths of third contention windows; and
    said fourth message further comprises a fourth start time and a fourth expiration time for said fourth set of lengths of fourth interframe spacings and said fourth set of maximum lengths of fourth contention windows.

7. The method of claim 6, wherein said first start time, said first expiration time, said second start time, said second expiration time, said third start time, said third expiration time, said fourth start time, and said fourth expiration time are based at least in part on at least one of:

number of first stations associated with said first wireless access point;
number of second stations associated with said second wireless access point;
priority of a first traffic stream to be transmitted by said at least one first wireless device;
priority of a second traffic stream to be transmitted by said at least one second wireless device;
previous priority of a first basic service set associated with said first wireless access point; and
previous priority of a second basic service set associated with said second wireless access point.

8. The method of claim 1, wherein:
said first message further comprises a third set of lengths of third interframe spacings and a third set of maximum lengths of third contention windows; and
said second message further comprises a fourth set of lengths of fourth interframe spacings and a fourth set of maximum lengths of fourth contention windows;
wherein said third set of lengths of third interframe spacings, said third set of maximum lengths of third contention windows, said fourth set of lengths of fourth interframe spacings, and said fourth set of maximum lengths of fourth contention windows are configured such that the probability of said at least one second wireless device accessing said RF channel is greater than the probability of said at least one first wireless device accessing said RF channel.

9. An apparatus for controlling access priority to a radiofrequency (RF) channel between at least one first wireless device associated with a first wireless access point having a first RF coverage area and at least one second wireless device associated with a second wireless access point having a second RF coverage area, and wherein said at least one first wireless device and said at least one second wireless device access said RF channel via a collision sense multiple access/collision avoidance (CSMA/CA) mechanism, said apparatus comprising:
means for transmitting to said at least one first wireless device a first message comprising a first set of lengths of first interframe spacings and a first set of maximum lengths of first contention windows; and
means for transmitting to said at least one second wireless device a second message comprising a second set of lengths of second interframe spacings and a second set of maximum lengths of second contention windows;
wherein said first set of lengths of said first interframe spacings, said first set of maximum lengths of said first contention windows, said second set of lengths of said second interframe spacings, and said second set of maximum lengths of said second contention windows are configured such that the probability of said at least one first wireless device accessing said RF channel is greater than the probability of said at least one second wireless device accessing said RF channel;
wherein said means for transmitting a first set of lengths of first interframe spacings and a first set of maximum lengths of first contention windows to said at least one first wireless device comprises: means for transmitting a first channel access throttling frame comprising a first enhanced distributed channel access parameter set to said at least one first wireless device; and
wherein said means for transmitting a second set of lengths of second interframe spacings and a second set of maximum lengths of second contention windows to said at least one second wireless device comprises:
means for transmitting a second channel access throttling frame comprising a second enhanced distributed channel access parameter set to said at least one second wireless device.

10. The method of claim 1,
wherein said first enhanced distributed channel access parameter set comprises:
a first set of lengths of first arbitration interframe spacings, wherein each length in said first set of lengths of first arbitration interframe spacings is based at least in part on a corresponding first access category;
a first set of minimum upper bounds of first contention windows, wherein each minimum upper bound in said first set of first minimum upper bounds is based at least in part on said corresponding first access category; and
a first set of maximum upper bounds of said first contention windows, wherein each upper bound in said first set of maximum upper bounds is based at least in part on said corresponding first access category; and
wherein said second enhanced distributed channel access parameter set comprises:
a second set of lengths of second arbitration interframe spacings, wherein each length in said second set of lengths of said second arbitration interframe spacings is based at least in part on a corresponding second access category;
a second set of minimum upper bounds of second contention windows, wherein each minimum upper bound in said second set of minimum upper bounds is based at least in part on said corresponding second access category; and
a second set of maximum upper bounds of said second contention windows, wherein each maximum upper bound in said second set of maximum upper bounds is based at least in part on said corresponding second access category.

11. The method of claim 10,
wherein said first enhanced distributed channel access parameter set further comprises a first set of first maximum transmission limits; and
wherein said second enhanced distributed channel access parameter set further comprises a second set of maximum transmission limits.

12. The method of claim 10,
wherein the shortest length in said second set of lengths of second arbitration interframe spacings is greater than the longest length in said first set of lengths of first arbitration interframe spacings.

13. The method of claim 10,
wherein the smallest second minimum upper bound in said second set of second minimum upper bounds is greater than the largest first minimum upper bound in said first set of first minimum upper bounds; and
wherein the smallest second maximum upper bound in said second set of second maximum upper bounds is greater than the largest first maximum upper bound in said first set of first maximum upper bounds.

14. The method of claim 10,
wherein the shortest length in said second set of lengths of second arbitration interframe spacings is greater than the longest length in said first set of lengths of first arbitration interframe spacings;
wherein the smallest second minimum upper bound in said second set of second minimum upper bounds is greater than the largest first minimum upper bound in said first set of first minimum upper bounds; and wherein the smallest second maximum upper bound in said second set of second maximum upper bounds is greater than the largest first maximum upper bound in said first set of first maximum upper bounds.

15. The apparatus of claim 9, further comprising:
means for assigning said first wireless access point as a master access point; and
means for transmitting control messages from said first wireless access point to said second wireless access point.

16. The apparatus of claim 9,
wherein said means for transmitting a first set of lengths of first interframe spacings and a first set of maximum lengths of first contention windows to said first wireless device comprises:
means for transmitting a first beacon frame comprising a first enhanced distributed channel access parameter set to said at least one first wireless device; and
wherein said means for transmitting a second set of lengths of second interframe spacings and a second set of maximum lengths of second contention windows to said second wireless device comprises:
means for transmitting a second beacon frame comprising a second enhanced distributed channel access parameter set to said at least one second wireless device.

17. A non-transitory computer readable medium wherein the computer program instructions further comprise computer program instructions defining the steps of: storing computer program instructions for controlling access priority to a radiofrequency (RF) channel between at least one first wireless device associated with a first wireless access point having a first RF coverage area and at least one second wireless device associated with a second wireless access point having a second RF coverage area, and wherein said at least one first wireless device and said at least one second wireless device access said RF channel via a collision sense multiple access/collision avoidance (CSMA/CA) mechanism, the computer program instructions defining the steps of:
transmitting to said at least one first wireless device a first message comprising a first set of lengths of first interframe spacings and a first set of maximum lengths of first contention windows;
transmitting to said at least one second wireless device a second message comprising a second set of lengths of second interframe spacings and a second set of maximum lengths of second contention windows;
receiving a first beacon at a monitor station, wherein said first beacon is transmitted by said first wireless access point;
receiving a second beacon at said monitor station, wherein said second beacon is transmitted by said second wireless access point;
transmitting first beacon information and second beacon information to a manager, wherein said first beacon information is based at least in part on said received first beacon and wherein said second beacon information is based at least in part on said received second beacon;
transmitting first control messages from said manager to said first wireless access point; and
transmitting second control messages from said manager to said second wireless access point;
wherein said first set of lengths of said first interframe spacings, said first set of maximum lengths of said first contention windows, said second set of lengths of said second interframe spacings, and said second set of maximum lengths of said second contention windows are configured such that the probability of said at least one first wireless device accessing said RF channel is greater than the probability of said at least one second wireless device accessing said RF channel.

18. The non-transitory computer readable medium of claim 17, wherein the computer program instructions further comprise computer program instructions defining the steps of:
assigning said first wireless access point as a master access point; and
transmitting control messages from said first wireless access point to said second wireless access point.

19. The non-transitory computer readable medium of claim 17,
wherein the computer program instructions defining the step of transmitting to said at least one first wireless device a first message comprise computer program instructions defining the step of:
transmitting a first beacon frame comprising a first enhanced distributed channel access parameter set to said at least one first wireless device; and wherein the computer program instructions defining the step of
transmitting to said at least one second wireless device a second message comprise computer program instructions defining the step of:
transmitting a second beacon frame comprising a second enhanced distributed channel access parameter set to said at least one second wireless device.

20. The non-transitory computer readable medium of claim 19,
wherein said first enhanced distributed channel access parameter set comprises: a first set of lengths of first arbitration interframe spacings, wherein each length in said first set of lengths of first arbitration interframe spacings is based at least in part on a corresponding first access category;
a first set of minimum upper bounds of first contention windows, wherein each minimum upper bound in said first set of first minimum upper bounds is based at least in part on said corresponding first access category; and
a first set of maximum upper bounds of said first contention windows, wherein each upper bound in said first set of maximum upper bounds is based at least in part on said corresponding first access category; and wherein said second enhanced distributed channel access parameter set comprises:
a second set of lengths of second arbitration interframe spacings, wherein each length in said second set of lengths of said second arbitration interframe spacings is based at least in part on a corresponding second access category;
a second set of minimum upper bounds of second contention windows, wherein each minimum upper bound in said second set of minimum upper bounds is based at least in part on said corresponding second access category; and
a second set of maximum upper bounds of said second contention windows, wherein each maximum upper bound in said second set of maximum upper bounds is based at least in part on said corresponding second access category.

\* \* \* \* \*